(12) United States Patent
Lan

(10) Patent No.: US 12,126,290 B2
(45) Date of Patent: Oct. 22, 2024

(54) SYSTEMS CATCHING RESIDUAL ENERGY FROM AN ELECTRIC COIL

(71) Applicant: Gordon Lan, Chester Hill (AU)

(72) Inventor: Gordon Lan, Chester Hill (AU)

( * ) Notice: Subject to any disclaimer, the term of this patent is extended or adjusted under 35 U.S.C. 154(b) by 184 days.

(21) Appl. No.: 17/767,044

(22) PCT Filed: May 4, 2021

(86) PCT No.: PCT/AU2021/050405
§ 371 (c)(1),
(2) Date: May 6, 2022

(87) PCT Pub. No.: WO2021/237272
PCT Pub. Date: Dec. 2, 2021

(65) Prior Publication Data
US 2022/0376644 A1 Nov. 24, 2022

(30) Foreign Application Priority Data
May 29, 2020 (AU) .................. 2020901761

(51) Int. Cl.
*H02P 3/14* (2006.01)
*B60L 50/40* (2019.01)
*H02J 7/14* (2006.01)
*H02J 7/34* (2006.01)
*H02P 29/00* (2016.01)

(52) U.S. Cl.
CPC .............. *H02P 29/00* (2013.01); *B60L 50/40* (2019.02); *H02J 7/1423* (2013.01); *H02J 7/1492* (2013.01); *H02J 7/345* (2013.01); *B60L 2200/12* (2013.01); *H02J 2207/20* (2020.01)

(58) Field of Classification Search
CPC .... B60L 50/40; B60L 2200/12; H02J 7/1423; H02J 7/345; H02J 7/1492; H02J 2207/20; H02P 3/14; H02P 29/00; Y02T 10/92
USPC ........................................................ 318/139
See application file for complete search history.

(56) References Cited

U.S. PATENT DOCUMENTS

| | | | | |
|---|---|---|---|---|
| 4,191,914 A | * | 3/1980 | Lecluse ................... | H02P 7/281 318/139 |
| 5,742,146 A | * | 4/1998 | Langhorst ............. | H02P 25/089 318/400.19 |
| 10,804,774 B1 | * | 10/2020 | Ogunbo ................. | H02K 13/04 |
| 2021/0296967 A1 | * | 9/2021 | Dorligjav ........... | H02K 11/0094 |

FOREIGN PATENT DOCUMENTS

| | | | | |
|---|---|---|---|---|
| JP | 2010193700 A | * | 9/2010 | |
| JP | 2011004582 A | * | 1/2011 | |

* cited by examiner

Primary Examiner — Gabriel Agared (57) ABSTRACT

A method of catching a residual energy stored in an electric coil of a self-inducted back-EMF from an armature of a PMBLDC motor while the motor running driven by a PWM signal is disconnected from a power source and accumulating the residual energy in a storage, and sending a portion of the energy in the storage to a rechargeable power source in order to extend the rechargeable power source's run-time and achieve higher energy efficiency.

8 Claims, 6 Drawing Sheets

United States Patent US 12,126,290 B2

SYSTEMS CATCHING RESIDUAL ENERGY FROM AN ELECTRIC COIL

TECHNICAL FIELD

This invention relates to the improvement of energy efficiency of electric motors by catching residual energy from the electric coils, the armature, while the motor is running, and feeding it back to a rechargeable power source. In this way it can save energy and prolong the power supply life. Lots of work has been carried out to improve the efficiency, like the new design motor itself and/or use electronic techniques. This invention falls into electronics to achieve a higher efficiency.

BACKGROUND

Electric motors are everywhere! Almost every mechanical movement that you see around is mainly driven by an AC (alternating current) or a DC (direct current) electric motor.

An electric motor is all about magnets and magnetism: A motor uses magnets to create motion. The fundamental law of all magnets is: attract or repel. If you have two magnet bars with their ends marked "north" and "south", then the north end will attract the south, vice versa. Inside an electric motor, alternating these attracting and repelling creates rotational motion.

In this invention, the Permanent Magnet Brushless Direct Current (PMBLDC) motor is concerned. Inside the motor, the armature is used to create an electromagnet and its north and south poles depend on the direction of current flowing through its coils. On the other hand, the field magnet is a permanent magnet (the field magnet could be an electromagnet as well, depending on applications).

To keep the rotor rotating, the armature needs to create a rotating magnetic field to pull one side while pushing the other side of a rotor by changing the direction of electrical current, which is called commutation. The commutation can be done mechanically, attached to the rotor with brushes or electronically. The latter (brushless) is widely used in modern motor commutation systems.

The commutation basically is a systematically switching energizing set of windings in an armature, making the magnetic field rotate step by step in one direction, the smaller the step, the smoother the rotation. From the law of physics, two types of back-EMF (BEMF) are generated in the armature in this switching driving manner, one by the relative movement between the stator and rotor; while the other by sudden cutting off current in the winding, such driving by Pulse Width Modulation (PWM). The former is caused by mutual induction while the latter is caused by self-induction within the windings of armature. These two components of BEMF are generated due to the same principle in physics, i.e., magnetic flux changing in the armature. Both induced BEMFs always oppose the change of the magnetic flux in the armature. Despite that, they are different in terms of waveform and appearance in time. First, the waveform generated from the mutual induction appears to be a smoothed sinusoidal waveform in the winding. In general, its amplitude is lower than supply voltage unless the motor is driven by an external force, such as inertial or brake force, in which the motor becomes an electric generator, which is not our concern in this invention. On the other hand, the waveform generated by self-induced in the winding appears at a high spike of a voltage at the instant of cutting-off current. In other words, it appears in a digital form instead of continuous waveform. That is our interest in this invention, which we name it as Residual Energy in the armature, also referred it as the BEMF throughout this context. The high voltage spike is due to sudden collapsing of magnetic flux in the winding. The peak voltage can be several times higher than supply voltage. If this is not controlled or suppressed, it can, in turn, but not limited to, cause the harms in the systems, such as causing arcing at contacts, reducing systems life, generating interference, damaging electronics circuitry.

The BEMF is a physical phenomenon, can not be eliminated, but it can be controlled to prevent damage, or made desirable for some specific applications, switch mode power supply (SMPS) is a typical example of such applications. In electric motor application, this BEMF is not desirable, and needs to be prevented. The objective of suppressing the BEMF is to prevent the high voltages spike occurring and dissipate the residual energy in a controllable manner. This prevention is vital in high current applications. There are a number of ways to do this, and one of them is simply to connect a so-called flywheel diode paralleled in reversed biased with the windings. When the supply voltage is connected the diode is reverse biased and is effectively out of circuit. When the switch is open, the collapsing magnetic field produces a BEMF in the opposite polarity and so the diode will conduct. In other words, the reverse biased diode provides a loop for the current to continue to follow. The diode does a very good job in suppressing the BEMF and clamps the voltage to around a one volt or so. The power dissipated by the diode is low because the forward voltage drop is around a volt. Thus, therefore, the majority of power dissipation occurs in the windings of the armature becoming heat.

Obviously, the residual energy in windings during the power off period neither contributes to the operation nor desirable, in other words, it is by-products to run the motor. In addition, it harms the systems.

Now, the invention is to turn the BEMF into useful, at the same time, eliminate the risks of damages to the system.

First, let's look at how much of the energy of the BEMF can be captured. From physics, the energy stored in a winding is:

$$E = \frac{1}{2}LI^2$$

Where E is Energy in Joule, L is Inductance in Henry, I is current in Ampere. The amount of energy stored in the windings is that at the moment just before the switch opens. One of the simple ways to deal with electric current in a coil is to remember the current can not be changed rapidly, the higher inductance, the slower change. In other words, the current will keep flowing inside the coil despite the electric loop broken. That is the residual energy this invention to catch from.

The energy stored in the winding is proportional to the inductance and square of current, which means the current is the dominated factor. Therefore high current applications produce such by-products more than low current counterparts. Many industrial applications have high current up to hundreds or thousands of Amperes, which means more energy is concerned. Take example, say, a winding with 100 mH, and a current 100 A, the energy stored in the winding would be 500 Joules, which is just a big waste, per one commutation cycle. It is obviously a huge benefit if we can find a way to catch the residual energy in the windings, and reuse, either sending back to the supply source to prolong the supply or other rechargeable power source. This becomes vital important in electric vehicles applications. With this mindset, the inventor curiously and tirelessly figures out such innovative methods, for such energy in the armature could be captured and accumulated into an energy storage and sent back to the supply source again.

Figure 1:
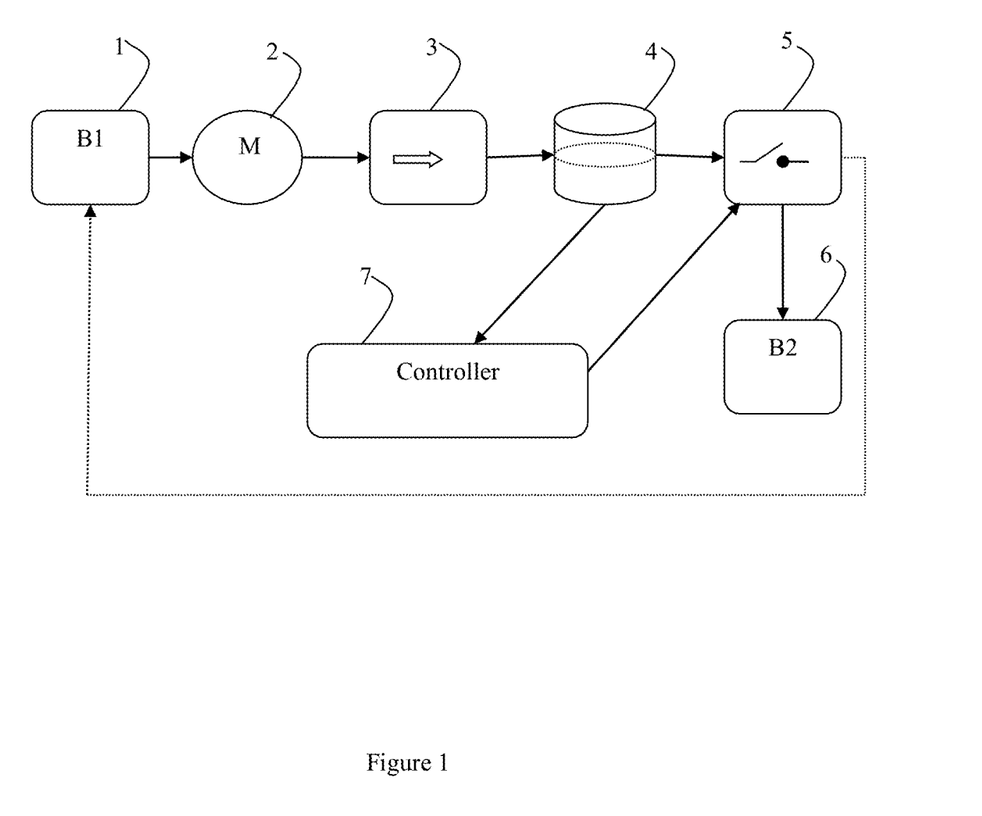
FIG. 1, Functional diagram in-cooperated with inventive systems consist of Power supply battery (1); Electric motor (2); Residual energy capturer (3), Energy storage (4), Energy passing switch (5), Receiving rechargeable battery (6), and a Controller (7).

The operational idea is shown in FIG. 1. Power supply (1) drives the PMBLDC motor (2); circuit (3) catches the BEMF energy and passes to storage (4); the controller (7) commends the switch to conduct when reaching a threshold and pass the stored energy to a rechargeable battery (6) or back to the supply source (1).

Now, let's look at the energy storage side using a capacitor. From physics, the total energy stored in a capacitor is:

$$E = \frac{1}{2}CV^2$$

Where E is Energy in Joule, C is capacitance in Faraday and V is Volts in the capacitor. Take example, the total energy stored in capacitor with value 10,000 uF, and 10 volts, is 5 Joules. The energy stored in the capacitor is proportional to capacitance and square of voltage in the capacitor. The voltage is the dominated factor for the energy stored. The goals of this invention is to catch the BEMF energy during the de-energized period, and send back to the power source with neither affecting the normal operation of the motor nor drawing extra energy from the power supply. In such way, the inventive circuitry can truly recycle the BEMF energy and prolong the running time for the power sources, achieving the higher efficiency.

SUMMARY

Energy saving and sustainability have become hot topics nowadays in every sector. Electric mobile applications, such as electric vehicles, always pursue higher energy efficiency other than applications with secured permanent power sources. Therefore, lots of research and development work have been carried out to increase the energy efficiency in every aspect, such as electric motor structure design and/or, electronic techniques. This invention discloses methods to catch the residual energy from an armature and send it back to the rechargeable power sources with electronic techniques. In a plain and simple expression, the inventive systems act as a bucket sitting underneath of a leaking water pipe, collecting the leaked water and pouring back to the reservoir when the bucket is full. The inventions disclose the ideas and workable solutions with 2 prototypes using 2-phase and 3-phase PMBLDC motors as examples. By recycling the residual energy, it extends the run time of battery systems, achieving higher energy efficiency. The benefit is huge, but not limited to, in economical and environmental fields.

BRIEFLY DESCRIPTION OF DRAWINGS

Embodiments of the present invention will be described in further detail with reference to the drawings from which further features, embodiments and advantages may be taken. All waveform diagrams are not scaled, rather, they are for qualitative analysis purposes.

DETAILS OF DESCRIPTION

The functional operations of this innovation are shown in FIG. 1. The power supply (1) drives the electric motor (2). It is straightforward up to this point. While the motor (2) is running, the catching component (3) connected to windings of motor (2) catches the residual energy and passes to the storage device (4). The controller (7) monitors the energy level in the storage (4) and commands the switch (5) to conduct, passing portion of the energy to the rechargeable power (6) or power supply (1), according to the hysteresis set. The hysteresis is important and necessary to avoid erratic operation of the switch (5). There are two options for the stored energy passing to, either the power supply (1) or receiving battery (6).

Figure 2:
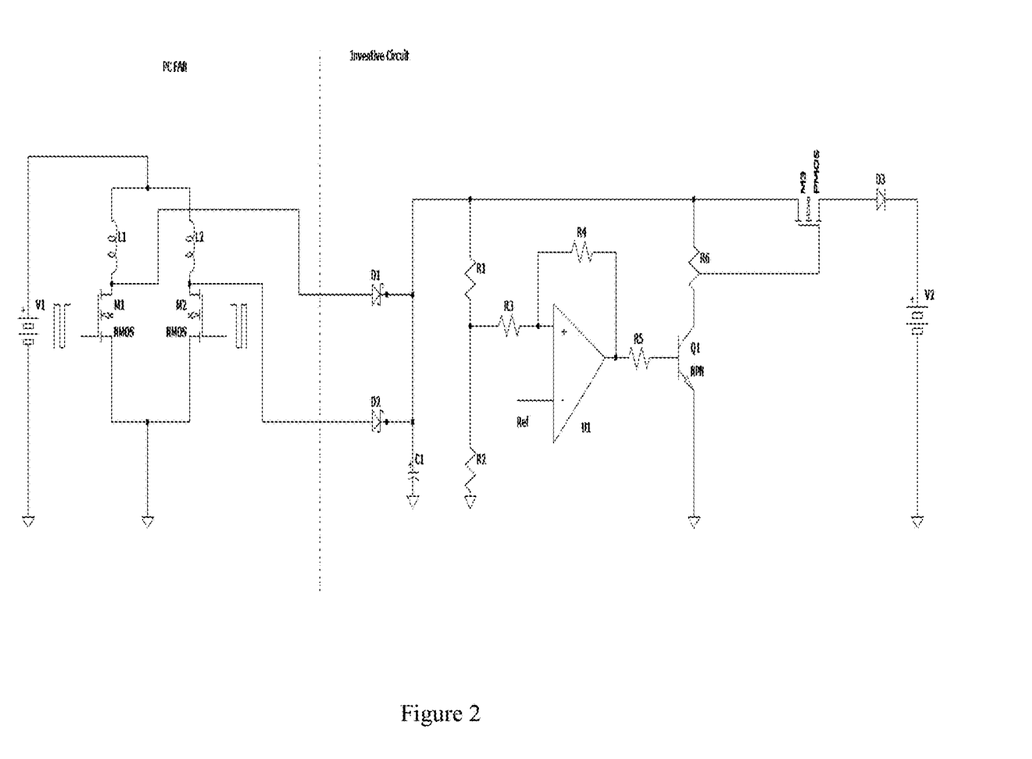
FIG. 2, Schematics of 2-phase PMBLDC motor in-cooperated with inventive circuitry.

To implement the idea as above in a practical way, a prototype has been built using a popular low-side-drive of 2-phase of PC PMBLDC motor to prove the idea, shown in FIG. 2, as the first example.

The PC PMBLDC motor with specifications of 6 W and 12 V is used to simulate the running electric motor. The structure of this PC PMBLDC motor is an out-runner type rotor with permanent magnets and the stator has 4 poles wound with 4 coils, 2 coils connected in series forming windings (L1, L2). One end of windings (L1, L2) connects together to power supply, while the other ends connect to D pins of MOSFETs (M1, M2). Some motors may have reversed biased flywheel diodes connected with windings (L1, L2). In this case, we just need to reconnect the cathodes of the existing diodes to the capacitor (C1) as shown in FIG. 2.

Figure 3:
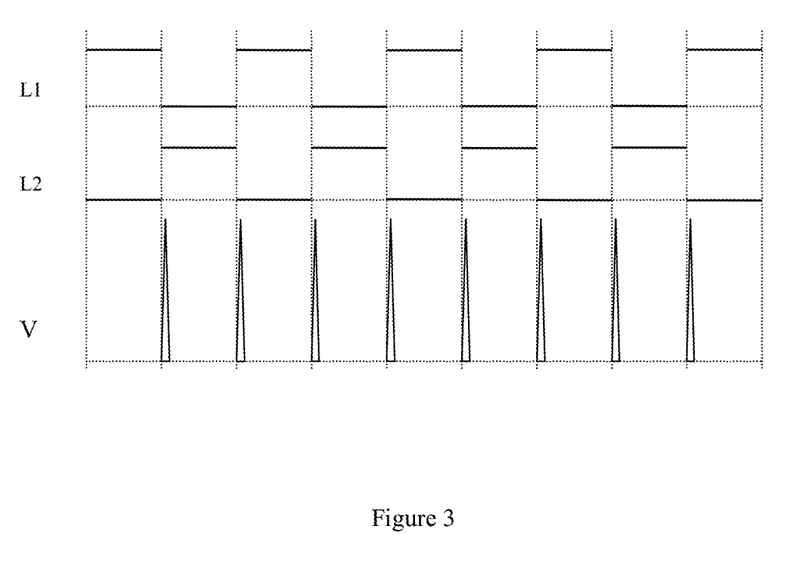
FIG. 3, Voltage waveform on the gate terminals of MOSFETs (M1, M1) and BEMF of 2-phase PMBLDC Motor.

The FIG. 3 illustrates the output waveform related to MOSFETs (M1, M2), and BEMF appears at drain terminals of the MOSFETs (M1, M2). The upper two traces are the voltage at gates terminals, and the bottom trace is the BEMF produced. It appears in high spike voltage at the moment of MOSFETs (M1, M2) being turned off. If those voltage spikes were not controlled, then damages may occur to the system. With flywheel diodes (D1, D2) connected to the storage capacitor (C1), which absorbs the burst energy and smoothes level to the voltage at the capacitor (C1). This configuration achieves multi-goals in one attempt.

The normal operation of this PC PMBLDC motor is as: MOSFETs (M1, M2) are driven by series of a pulse generated from existing circuitry with hall sensors built-in, energizing windings (L1, L2) exclusively, so does the current flows in the windings (L1, L2). MOSFETs (M1, M2) are operated in a so-called "break before close" manner to avoid confused status, which has been taken care of by the existing circuitry. So far, there is no difference from ordinal PC PMBLDC motor operation and driving circuits, seen in the PC Fan side in FIG. 3.

Now, let's look at the inventive circuit side. As seen, the invention acts as a portable device to the motor running system. The flywheel diodes (D1, D2) are connected to a storage capacitor (C1) and Windings (L1, L2), as shown in FIG. 3. A voltage comparator (U1) is monitoring the voltage at the capacitor (C1) and will turn to 'high' to drive the transistor (Q1) to conduct once reaching the threshold level in the capacitor (C1). This, in turn, drives the P-channel MOSFET (M3) to pass the electric energy stored in capacitor (C1) to the rechargeable battery (V2). The portion of energy in the storage capacitor (C1) to be passed to the battery (V2) is determined by the hysteresis set with a pair of resistors (R3, R4). When the voltage at capacitor (C1) falls below the threshold level, the comparator (U1) will turn to 'low', switching off transistor (Q1), so doing to the P-channel MOSFET (M3) to isolate the rechargeable battery (V2) from the system. The pair of resistors (R1, R2) forms a voltage divider for the reference (Ref) connected to the inverted pin to compare with. Diode (D3) is to prevent current flowing back to the system from the receiving power source (V2).

At the initial start of running the motor, there will be an extra current drawn to charge up the storage capacitor (C1). However, this extra drawing is neglected compared to the long run of the motor. One of the solutions is intentionally to keep the voltage at the storage capacitor (C1) higher than the supply voltage by other means.

Figure 5:
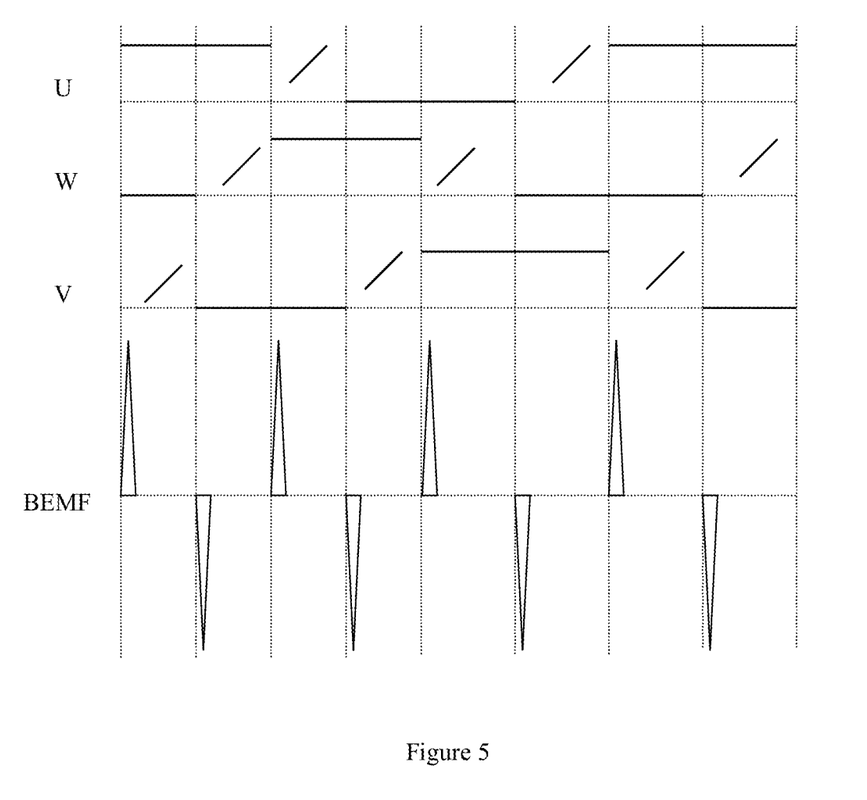
FIG. 5, a 6-step Driving sequence of 3-phase PMBLDC motor of "Y" configuration and their BEMF waveform associated.
Figure 6:
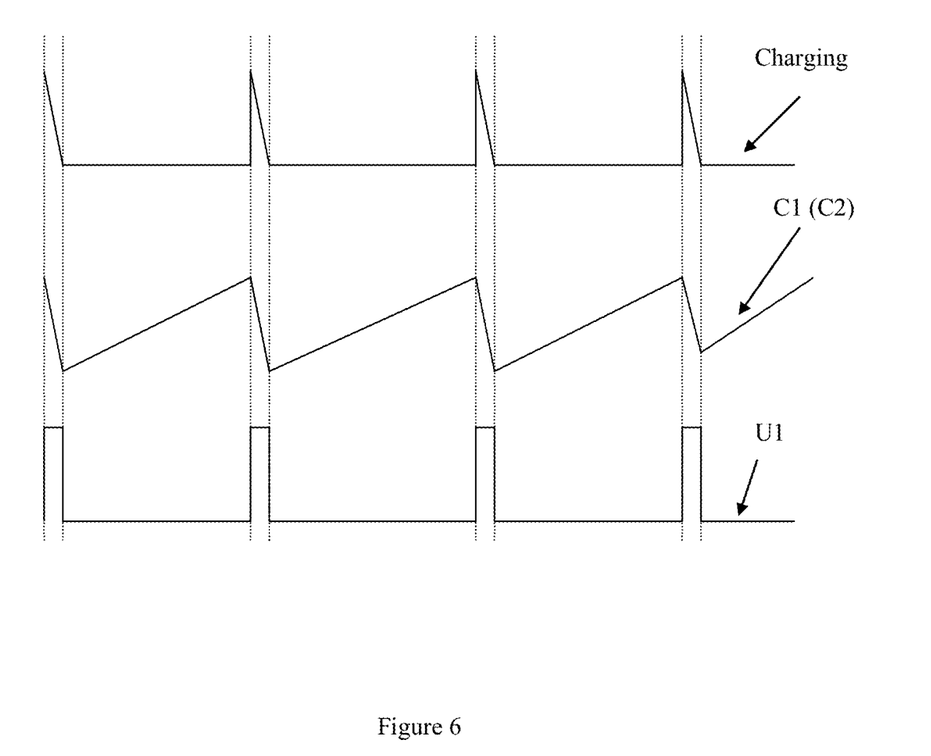
FIG. 6, Output stage waveforms showing charging operation.

Further, FIG. 5 shows the operations of three output waveforms of this residual energy recycling system, the top trace being the voltage charged to the rechargeable battery source (V2), the middle trace being the voltage levels of the capacitor (C1), and the lower trace being the output waveform of the comparator (U1). During the charging cycle of this system, it is a pulse charging to the rechargeable battery source (V2), and that the voltage level of the capacitor (C1) varies within the hysteresis gap.

Figure 4:
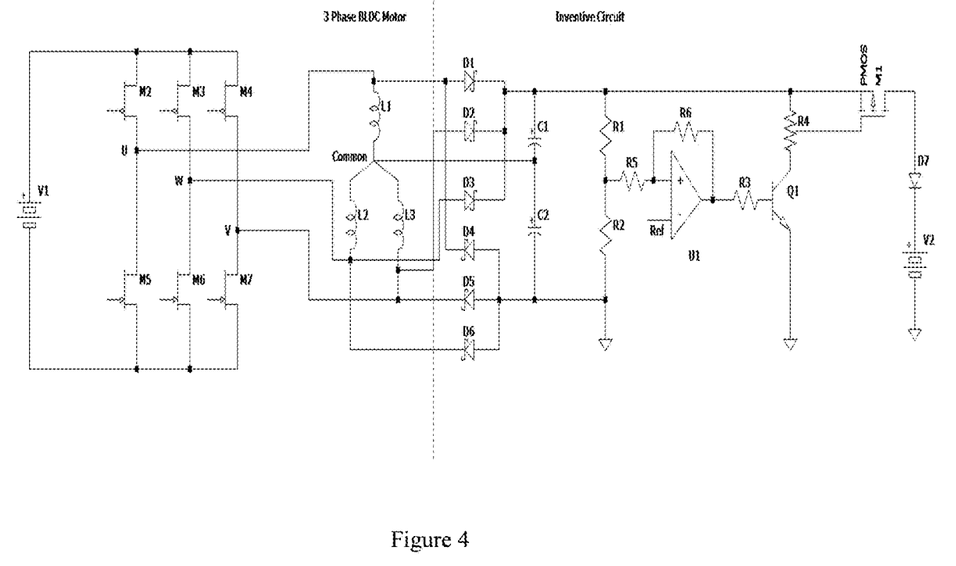
FIG. 4, Schematic Diagram of 3-phase PMBLDC Motor in "Y" configuration in-cooperated with inventive circuitry.

To extend the coverage for other types of motor, a second prototype has been built using a popular PMBLDC 3-phase motor to prove the suitability as another example, which is shown on FIG. 4. The structure of this PC 3-phase PMBLDC motor is also an out-runner type rotor with permanent magnets and the stator has 6 poles wound with 6 windings paired in 3 forming windings (L1-L3), separated each other by 120°. The wiring connection is "Y" and driven by a 6-step waveform generated from 3 half-bridge circuits. Same as the first example, the systems are divided into two parts, the existing 3-phase motor driving system and portable inventive circuitry. As usual, we don't need to concern the 3-phase motor part, leave the existing electronic control systems as they are.

Now, let's analyze the operation on this 3-phase motor. Referring to FIG. 5, there are always two windings being energized while one winding in floating status marked with "/", at which time the BEMF occurs and to be captured with one of 6 diodes (D1-D6). The diodes (D1-D6) are configured as a 3-phase full-bridge rectifier, which is to convert the alternative BEMF waveforms to DC for the capacitors (C1, C2) to store, seen in FIG. 5. Capacitors (C1, C2) are connected in series and their common is connected to the common circuit point (Common) of three windings (L1-L3). The rest are the exact same as the 2-phase PMBLDC motor configuration mentioned in the first example.

Now, let's turn the inventive process, referring to schematic diagram FIG. 4, at start, the circuit point (U) is high while circuit point (W) is low, and circuit point (V) is floating. The current flows from circuit point (U) to circuit point (W) in step 1, energizing windings (L1, L2). In step 2, circuit point (W) is floating, and V is low, now, current flows from U to V, energizing L1 and L3. At the same time, the current flow in winding (L2) is disrupted and the induced BEMF causes the diode (D3) to conduct, charging capacitor (C1) and returns to the circuit point (Common), forming a close loop for the residual current to continue to follow. The other windings follow the same way to charge capacitor (C1) as winging (L2), when the current flows out of the windings and returns to the circuit point (Common), charging capacitor (C1). The current flowing out of windings (L1-L3) situation occurs when circuit points (U, V, W) transiting from low to floating status. The BEMF induced charges capacitor (C1) via diodes (D1-D3).

Now, let's look at the situation when current flows into the windings. In step 3, circuit point (U) is floating, current in winding (L1) continues to flow into the circuit point (Common), due to BEMF, charging capacitor (C2) via diode (D4) returning to circuit point (U). The other windings with flowing-in current charge C2 via D5, and D6, return to circuit points (W, V), respectively. The current flowing-in of windings (L1-L3) situation occurs when circuit points (U, V, W) transiting from high to floating status. The BEMF induced charges capacitor (C2) via diodes (D4-D6). We can see capacitors (C1, C2) are charged 3 times each per one revolution. Capacitors (C1, C2) are connected in series, the output of voltage being sum of voltages at capacitors (C1, C2) are connected to a voltage divider formed with resistors (R1, R2). The rest and the operations are exact same as the first example.

All those configurations have the same feature, simple, low cost and easy to implement, can be designed as portable units or integrated into the existing systems. In addition, they are neither affecting nor drawing extra energy from the power source; because they perform the recycling function at the time when the electrical loop of winding is disconnected from the power supply source. Furthermore, the systems can also catch the electric energy by mutual induction in the armature when the motor systems become electric generator, at which occurs by mechanical movement force, such inertial force, as long as the BEMF voltage is higher than supply voltage. From a charging battery point of view, it is an apparent pulse charging method. As known, the pulse charging method has advantages over the constant charging counterpart.

The invention claimed is:

1. A system for catching residual energy stored in an electrical coil of Permanent Magnet Brushless Direct Current (PMBLDC) comprises:
   a catching unit configured to catch a self-inducted back-electromotive force (SBEMF) residual energy in said electrical coil, when said electrical coil driven by a Pulse Width Modulation (PWM) is disconnected from a power source;
   an energy storage unit configured to accumulate voltage of said SBEMF energy;
   a switching unit configured to output a portion of the stored energy to a rechargeable power source;
   a control unit configured to compare the accumulated voltage level to a threshold level to control the switch unit to pass said portion of the energy in said storage unit to the rechargeable power source according to a hysteresis determined by hysteresis set;
   wherein said electrical coil is driven by a low-side drive of at least a two phase PMBLDC motor controlled by the PWM signal;
   wherein said catching unit comprises anode of a diode that is connected to said electrical coil and cathode of said diode that is connected to said energy storage unit, catches said SBEMF energy while preventing a back flow from said storage unit to the power source;

wherein said diode suppresses a high voltage spike caused by said SBEMF energy in the coil during disconnecting power period while catching said SBEMF energy to said storage unit; and wherein said diode suppression is only performed to prevent said SBEMF energy loss in the electrical coil.

2. The system according to claim 1, wherein the low-side drive is applied to electrical coils of a 3-phase PMBLDC motor.

3. The system according to claim 1, wherein said storage unit comprises a capacitor configured to have its positive terminal connected to the cathode terminal of said diode and its negative terminal to the ground to accumulate voltage of said SBEMF energy.

4. The system according to claim 1, wherein the catch unit accommodates electrical coils of a 3-phase PMBLDC motor where the coils are in "Y" configuration driven by 3 half-bridges comprising 6 switches controlled by a PWM signal, wherein said catch unit comprises 3 pairs of diodes connected in series and a common node connected to each coil, where the diodes are connected to positive and negative terminals of said storage unit, wherein said storage unit comprises two capacitors connected in series where a centre-tap of the capacitors are connected to said common node of said "Y" configuration and said catching unit in order to catch full wave of said SBEMF energy.

5. The system according to claim 1, wherein said switching unit comprises a switching component that is a MOSFET, a transistor or a controllable switch.

6. The system according to claim 1, wherein said control unit comprises a voltage comparator, an operational amplifier, to control said switch unit to pass portion of the accumulated voltage of said SBEMF energy to the rechargeable power source according to the determined hysteresis, which performs a high current pulse charging operation distinguishing from low current constant charging method, achieving an effective charging result, and safeguards the back flow of electricity from said rechargeable power source.

7. The system according to claim 1, wherein said electrical coil is an armature of 3-phase PMBLDC motor configured in "Y" connection, driven by 3 half-bridges controlled by the PWM signal.

8. The system according to claim 1, wherein said PMBLDC motor is an electric motor used in electric vehicle, electric bike, scooter and car.

* * * * *